(12) United States Patent
Sargaison et al.

(10) Patent No.: US 8,166,131 B2
(45) Date of Patent: Apr. 24, 2012

(54) NETWORK DELIVERY OF ENTERTAINMENT SOFTWARE

(75) Inventors: Stewart Sargaison, Foster City, CA (US); Brian Watson, Burlingame, CA (US); Simon Booth, Burlingame, CA (US); Victor Octav Suba Miura, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 802 days.

(21) Appl. No.: 12/234,088

(22) Filed: Sep. 19, 2008

(65) Prior Publication Data

US 2009/0094600 A1   Apr. 9, 2009

Related U.S. Application Data

(60) Provisional application No. 60/974,391, filed on Sep. 21, 2007.

(51) Int. Cl.
*G06F 15/16*   (2006.01)
*G06F 9/445*   (2006.01)

(52) U.S. Cl. ........................................ 709/217; 717/177

(58) Field of Classification Search .......... 717/176–177, 717/178; 463/37; 709/217–219
See application file for complete search history.

(56) References Cited

U.S. PATENT DOCUMENTS

| | | | |
|---|---|---|---|
| 7,465,231 B2 * | 12/2008 | Lewin et al. | 463/37 |
| 7,716,138 B2 * | 5/2010 | Szeles | 705/56 |
| 2002/0094863 A1 | 7/2002 | Klayh | |
| 2005/0261062 A1 | 11/2005 | Lewin et al. | |
| 2006/0074750 A1 | 4/2006 | Clark et al. | |
| 2006/0160622 A1 | 7/2006 | Lee et al. | |
| 2008/0234047 A1 * | 9/2008 | Nguyen | 463/42 |

* cited by examiner

*Primary Examiner* — Chirag R Patel
(74) *Attorney, Agent, or Firm* — Steptoe & Johnson LLP

(57) ABSTRACT

A system and method for preparing entertainment software for reduced network delivery time includes analyzing entertainment software to identify a first stage implementing a subset of the functionality of the entertainment software such that the first stage is deliverable to an entertainment platform across a network more quickly than the delivery of the entire entertainment software, and preparing the identified first stage for download, such that the identified first stage may be downloaded and used on the entertainment platform.

12 Claims, 2 Drawing Sheets

NETWORK DELIVERY OF ENTERTAINMENT SOFTWARE

CROSS-REFERENCE TO RELATED APPLICATIONS

This application claims the benefit of U.S. Provisional Application No. 60/974,391, filed Sep. 21, 2007. This application is co-pending with U.S. Provisional Application Ser. No. 60/974,396 filed Sep. 21, 2007, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

Briefly, and in general terms, this disclosure relates to the downloading and/or network delivery of entertainment software, such as, for example, video games. More particularly, the disclosure relates to techniques for decreasing the latency associated with network-delivered entertainment software before such software becomes operational.

BACKGROUND

Broadband network access is nearing ubiquity in consumer households, enabling many new products, services, and features. For example, entertainment platforms (including computers, video game consoles, portable video game devices, cell phones, personal digital assistants ("PDAs") and the like) now provide networking capabilities, enabling, among other products and services, online game play, software updates, rankings, community features, and the like. In addition, broadband network access enables a new sales mechanism for entertainment software and data, such as, video games, demonstration versions of video games, movie and video game trailers, movies, music, audio, and the like—instead of purchasing games in stores or placing an order for delivery, a customer may download purchased software across a broadband network for use on an entertainment platform.

However, modern video games, such as many of those designed for distribution by CD-ROM, DVD-ROM, Blu-ray Disc, or the like, are typically large in size, necessitating long download times. It is desirable to decrease the time between when a user requests a network-delivered game and when that game is available for play.

SUMMARY

Generally, there is disclosed a method for preparing entertainment software for reduced network delivery time. The method includes analyzing entertainment software to identify a first stage that implements a subset of the functionality of the entertainment software such that the first stage is deliverable to an entertainment platform across a network more quickly than the delivery of the entire entertainment software, and preparing the identified first stage for download, such that the identified first stage is usable on the entertainment platform to execute a subset of the functionality of the entertainment software.

The entertainment software can be analyzed by executing it using an emulator one or more times, collecting data related to the execution of the entertainment software using the emulator, and using the data collected by the emulator to identify the first stage. In some implementations, user input is used, as well, to identify the first stage. For example, a user may indicate that a portion of the entertainment should or should not be included in the first stage.

Entertainment software is typically stored on a data storage device (such as a cartridge, a hard drive, an optical disk, a server, network-accessible data storage, or the like). Collected data may include identification of logical or physical portions of the entertainment software accessed during the execution of the entertainment software.

The first stage typically only includes those portions of the entertainment software implementing a subset of the functionality of the entire entertainment software. For example, the determined subset of a video game may be one or more levels, one or more opponents, one or more races, and the like.

In some implementations, a two-stage download is used such that the first step may be downloaded and played before the second stage is delivered. In this case, the second stage may include, for example, the portions of the entertainment software not within in the first stage. Any number of additional stages may be used. Various steps may be used to prepare each stage for download, such as, compressing portions of the software, removing portions of the software, and the like.

Also disclosed is a server enabling the network delivery of entertainment software. The server includes a data store containing an entertainment software title having a first usable stage and at least one additional stage, a network interface, and a processor coupled to the data store and the network interface. The processor is configured to deliver the entertainment software title by first delivering the first usable stage and then delivering additional stage(s).

Generally, a method for distributing video games across a network includes distributing a first stage of a video game facilitating game play of a portion of the video game, and distributing a second stage of the video game facilitating game play of a portion of the video game not provided by the first stage. The first stage of the video game is usable to play the video game before the second stage of the video game has been received. The second stage may be distributed automatically, upon request, upon satisfaction of a predetermined condition, and the like.

Other features and advantages will become apparent from the following detailed description, taken in conjunction with the accompanying drawings, which illustrate by way of example, the features of the various embodiments.

DETAILED DESCRIPTION

This disclosure sets forth systems and techniques to improve the network delivery of entertainment software, including video games and the like. Consider, for example, an online store offering video games for purchase by consumers. While broadband access certainly enables the transfer and delivery of large amounts of data, a purchaser of a video game may be unhappy if the network delivery of a purchased game takes hours to complete. However, if the purchaser receives a playable portion of the purchased video game after a reasonably short amount of time, then the purchaser is less likely to mind a much longer network delivery time for the full video game. Approaches for reducing network download times outlined in this disclosure include the following: (i) reducing video game file size; and (ii) apportioning video game information into components such that a first playable component may be downloaded and played before or while additional components are being delivered.

Figure 1:
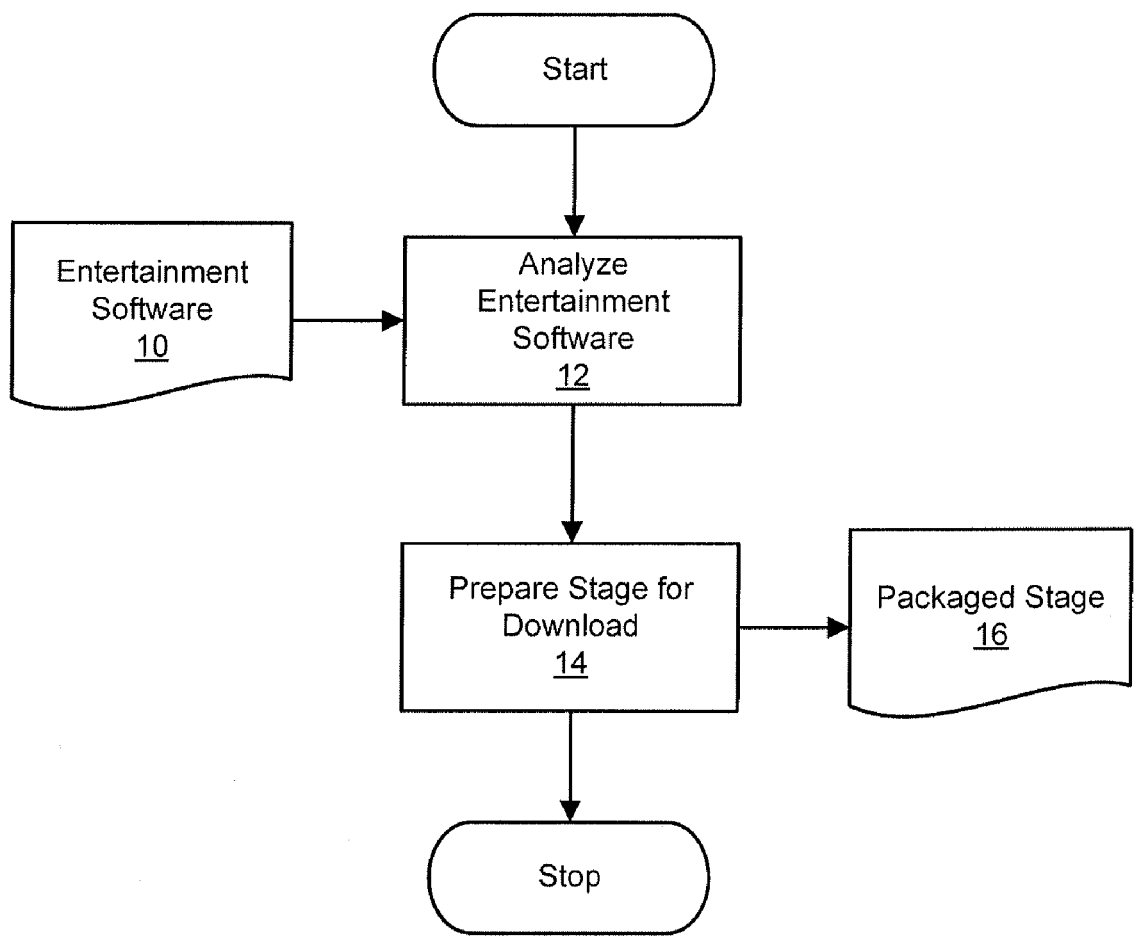
FIG. 1 is a flowchart of a method for preparing entertainment software for reduced network delivery time.

Referring to FIG. 1, a method for preparing entertainment software 10 for reduced network delivery time includes analyzing entertainment software (step 12) to identify a first stage implementing a subset of the functionality of the entire entertainment software 10 such that first stage is deliverable to an entertainment platform across a network more quickly than the delivery of the entertainment software 10, and preparing the identified first stage for download (step 14), creating a packaged first stage 16. The packaged first stage 16 is usable on the entertainment platform to execute a subset of the functionality of the entertainment software 10.

Various techniques may be used during the analysis 12 and preparation 14 of entertainment software 10 to create a subset of the entertainment software 10 for download. These techniques may include, but are not limited to, any of the following:

1. File Size Reduction. The entertainment software 10 may be analyzed to reduce the size of such entertainment software by eliminating portions, such as, for example, unused content, unnecessary content, overly large portions of content, and the like. In addition, the size of the entertainment software 10 may be reduced by compressing or otherwise reducing the data storage space of such content, using any available technology. In some implementations, the system identifies and presents candidates for elimination or compression by identifying logical content (using any available metadata or system information and/or by analyzing the entertainment software 10 contents to recognize logical content such as video, images, audio, text, data, and the like). In this implementation, the system identifies potential candidates for file size reduction from the logical content such that one or more of the candidates may be selected for file size reduction.

2. Object Replacement. The entertainment software 10 may be analyzed to identify replaceable content such as, code, data, text, audio, video, and the like. In some implementations, content type may be readily ascertainable. For example, if each video portion of the entertainment software 10 is stored as a separate file having a file type that indicates its contents, then videos used by the entertainment software 10 may be easily identified. However, in some implementations, content may be grouped and stored in a single file or in a proprietary format. In these implementations, it is possible to identify candidates for object replacement by reading or scanning the entertainment software 10 and recognizing logical content within the entertainment software 10, for example, by recognizing headers, data formats, and the like. In this manner, it is possible to recognize an MPEG video by first recognizing potential MPEG content by searching for MPEG headers. Additional logical content of any type may be identified in a similar manner. Once candidates for object replacement have been identified, some or all of candidates may be selected for object replacement.

Objects may be replaced in the packaged stage 16, they may be replaced after download, and/or they may be replaced on the fly during program execution. For example, a trailer advertising other entertainment software may be tagged as an advertisement. A replacement advertisement may be inserted during preparation 14 for download, or the system may tag the content such that during the execution of the packaged stage 16, any available content matching such tag may be inserted. In this manner, video content tagged "Trailer" may be replaced with a current trailer during program execution. A replacement trailer may be obtained from any source, such as, by streaming video data across a network, by downloading video content, by reading video content off of available media (e.g., a DVD, CD-ROM, Blu-ray disc, and the like), or data may be read from a local data storage unit.

3. Partial or Episodic Play. One way to analyze entertainment software (step 12) to identify a first stage is to execute the entertainment software 10 using an emulator that records various information regarding such execution. An emulator is computer software and/or hardware used to imitate a computer system or environment. For example, the emulator may record portions of the storage medium that are accessed during the execution of the entertainment software 10, such as the exact portions of the entertainment software 10 that are accessed, or other logical or physical portions. For example, for entertainment software 10 stored on a CD-ROM, an emulator can record the blocks on the CD-ROM that are accessed during such execution.

In one implementation, a PlayStation®2 video game platform emulator is used to create one or more packaged stages 16 to permit partial or episodic play. In this implementation, a PlayStation®2 video game platform emulator, implemented in hardware and/or software on an entertainment platform (e.g., PlayStation®2 video game platform, PlayStation®3 video game platform, or other device (e.g., a computer, entertainment platform, or the like), captures blocks accessed during the play of a PlayStation®2 video game title. This information is used to create one or more packaged stages 16 representing portions and/or episodes of play.

4. Encryption. In many implementations, it is desirable to protect downloadable content to prevent unauthorized copying and/or use. In such implementations, some or all of a packaged stage 16 is encrypted using any cryptographic technique, such as, for example, double-asymmetric encryption, any digital rights management ("DRM") cryptographic technique, public-key cryptography, symmetric cryptography, or the like.

5. Content Management. Entertainment software 10 sometimes includes portions that are shared between different entertainment software titles. For example, a splash screen identifying a publisher may be used in each of that publisher's titles. Accordingly, one technique that may be employed during the analysis 12 of the entertainment software 10 is to identify such portions used in multiple titles. Such content is cached or otherwise stored such that it usable by the multiple titles.

Content management may be implemented using techniques analogous to the content replacement discussed above. For example, shared content may be tagged for replacement by the shared content. One way to implement such a system is to use a logical tag corresponding to the desired content (e.g., "CompanySplash"). Then, content corresponding to "CompanySplash" is made available during the execution of the entertainment software 10 via any mechanism, for example, shared content may be provided through system updates, may be downloaded upon first use, delivered with or as part of a packaged stage 16, and the like.

6. Content Enhancement. The techniques described herein also may be used to enhance the content of the entertainment software 10. For example, the content enhancement techniques described in co-pending application U.S. Application Ser. No. z60/974,396 titled "Method and Apparatus for Emulation Enhancement" filed Sep. 21, 2008, which is hereby incorporated by reference. When entertainment software 10 is being packaged for execution on a platform having more or differing capabilities than that for which it was originally intended, it may be desirable to modify defaults, preferences, content, and/or functionality to improve a user' experience during execution of the packaged stage 16. Any content enhancement techniques may be incorporated in the packaged stage 16.

Figure 2:
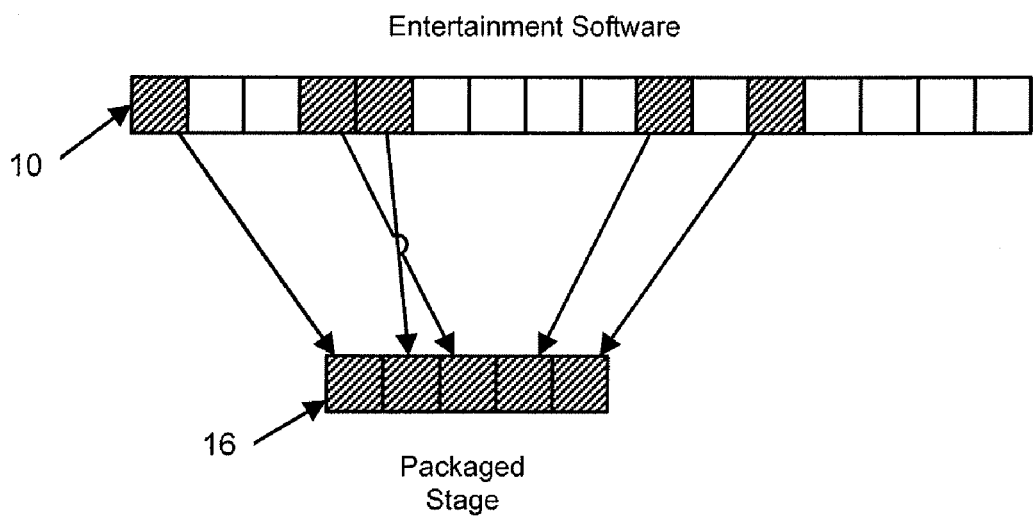
FIG. 2 is a diagram of a packaged stage showing the relationship between a packaged stage and corresponding entertainment software.

Referring to FIG. 2, one technique that may be employed to reduce download times before entertainment software is usable is to apportion entertainment software data into two or more segments, such that the first segment is playable before delivery of the remaining segment(s). FIG. 2 illustrates entertainment software 10 having five portions identified for a first stage (as shown by the shaded portions). These five portions may be packaged as first stage 16 such that they are usable before the download of the entire entertainment software is complete. For a video game, the packaged first stage 16 may include all information needed to play the first portion of a video game, and the remainder of the video game may be delivered in one or more additional segments.

Entertainment software 10 may be divided into stages in many ways, and the best technique will typically depend on the nature of the entertainment software 10. For example, for a video game having multiple levels, it is often desirable to use the first level or levels for the first stage. For a racing game, it may be desirable to provide the first race or races in the first stage. For a more freeform game, it may be best to simply provide those portions of the game that are typically accessed during a predetermined time interval (e.g., 10 minutes, 30 minutes, 1 hour, 2 hours, or any other time period).

Consider, by way of example, and not by way of limitation, a car racing game. So long as a user is able to participate in a single race, the game may be playable. In this situation, portions of the video game necessary to play one or more introductory races are placed in the first playable segment such that it may be downloaded and played before the rest of the game has been fully delivered. For example, the entire racing game may require 500 MB of data storage or more; however, an introductory race may be enabled using only 50 MB of data. By sending a first playable segment including only the 50 MB of data, the latency is reduced by an order of magnitude, greatly improving the user's overall experience. Additionally, while the user is playing the introductory game, the system may continue downloading the remaining segment(s).

In some situations, it may be sufficient to monitor the execution of the entertainment software 10 only one time on an emulator to identify those portions of the entertainment software 10 to include in the first stage; however, to better ensure that users will not inadvertently reach a portion of the entertainment software 10 not included in the first stage, it may be beneficial to monitor the execution of the entertainment software multiple times.

For example, to identify a first stage for a video game having levels, it may be desirable to capture data from multiple players playing the desired levels. For complex games with many ways to traverse the desired level(s), a large amount of data may be required; however, for games that are more restrictive, it may be satisfactory to use a single data point.

Figure 3:
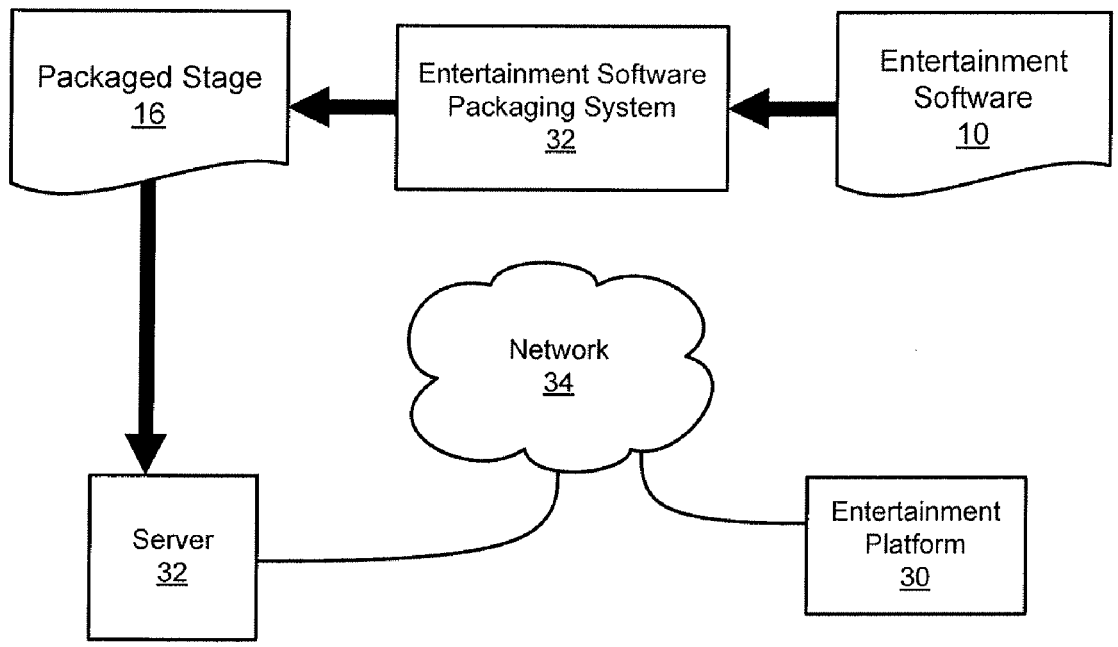
FIG. 3 is a network diagram of a system for downloading entertainment software.

Referring to FIG. 3, an entertainment platform 30 requests the delivery of the entertainment software 10 from the server 32 across a network 34. The entertainment platform 30 may be implemented using a computer, a video game console, a handheld video game device, a cell phone, PDA or the like. The entertainment platform 30 includes a network interface, such as, a serial port, a USB port, an Ethernet port, a wireless interface, or the like. Using the network interface, the entertainment platform 30 can be used to connect to the server 32 that facilitates that network delivery of entertainment software 10 through the network 34 (such as the Internet, a local area network, a wide area network, or any other data network). The server 32 may be implemented as a general-purpose computing device, a web server, an application server, or the like.

In some implementations, the server 32 provides an online store whereby a user of an entertainment platform 30 may purchase and/or request free copies of entertainment software that can be delivered through the network 34. For example, the store may offer video games, movie trailers, video game trailers, movies, add-ons, and the like.

Using conventional technology, an online store could provide network delivery of entertainment software 10 by delivering the entire entertainment software 10 as a single unit. However, using the techniques described herein, the server 32 can employ a staged network delivery. An entertainment software packaging system 36 analyzes the entertainment software 10, and prepares a packaged stage 16 that can be downloaded. This packaged stage 16 is usable until the remainder of the entertainment software 10 (or the entire set of entertainment software 10) is delivered.

In one implementation, the entertainment platform 30 is a video game console connected to the Internet. The video game console provides access to an online store where a user may purchase the entertainment software 10 including video games. When a user purchases a video game, the video game may be downloaded as a single file; however, for large data transfers, a staged download may be used to allow a user to download a playable portion of a purchased video game and to download the remaining stage(s) later. Alternatively, the remaining stage(s) may be downloaded while the user is playing the first portion.

To create a staged download for a video game, an emulator may be employed as described above to identify the portions of the video game that are accessed during game play. For example, the emulator can record which segments of memory or data storage were accessed during game play. Using such a system, a first playable segment 16 of a video game may be identified by monitoring those portions of the video game information that are accessed while the desired portion of the game is being played.

Consider, by way of example and not by way of limitation, the racing game discussed above. If the source code and/or programmers are available, it may be easiest to simply create a stripped down version of the racing game to distribute as the first playable segment; however, if only the video game information is available (as stored on a computer-readable medium, such as a CD-ROM, DVD-ROM, Blu-ray Disc, or the like), the video game information may be played through an emulator and each portion of the video game information that is accessed may be identified. Then, a first playable segment may be created using only the portions used during emulation. If a user encounters a portion that was not identified, then the system may be configured to display an error message, pause and wait for additional video game information to be downloaded, or the like.

One way to reduce latency is to reduce the amount of data that must be delivered. There are many techniques known in the art for compressing data and/or otherwise reducing data storage requirements which may be applicable to the network delivery of video games as described herein. Two such techniques are described in detail below: (i) compressing data to reduce storage requirements; and (ii) removing data, such as, for example, extraneous data to reduce storage requirements.

Entertainment software (such as, a video game or the like) typically includes both audio and video components, which may be compressed or further compressed to reduce storage requirements and improve latency. For example, audio data in a video game designed to be distributed by CD-ROM, DVD-ROM, and/or Blu-ray Disc may be stored in a high-quality format, such as that used in commercial Compact Discs. Compression techniques, such as MP3 or the like, may be used to significantly reduce the storage requirements of music and sounds accompanying a video game.

Video portions of video games may be similarly compressed.

Furthermore, to enhance bandwidths and reduce overhead, data may be downloaded in one format, e.g., MPEG-4, and then translated at the game machine into the format expected by such game machine, e.g., MPEG-2. Such data translation can be done either as processing permits or "on-the-fly." For example, various lossless compression techniques, such as statistical modeling algorithms (e.g., block-sorting compression, the Lempel-Ziv 1977 algorithm ("LZ77"), the Lempel-Ziv-Welch algorithm ("LZW"), and the like), encoding algorithms (e.g., Huffman coding, arithmetic coding, and the like), and the like. In addition, some segments of the entertainment software 10 may be compressed using lossy data compress techniques. For example, lossy compression techniques commonly used for graphics include fractal compression, JPEG, JPEG 2000, wavelet compression, JBIG2, Cartesian Perceptual Compression, and the like. Lossy compression techniques commonly used for video include Flash, H.261, H.263, H.264/MPEG-4 AVC, MNG, Motion JPEG, MPEG-1, MPEG-2, MPEG-4, and the like. Lossy compression techniques commonly used for audio include, AAC, ADPCM, ATRAC, Dolby AC-3, MP2, MP3, CELP, G.711, G.726, HILN, AMR, and the like.

In some implementations, the game platform does not directly support the compressed data. For example, a game platform may not support MP3 audio. In this situation, the entertainment platform 30 may be configured to convert the received data to another format that is supported (e.g., MP3 audio to ADPCM). Lossy compression may be converted to lossless compression formats, lossless to lossy, lossy to lossy, or lossless to lossless. This conversion may take place upon receipt of the network-delivered entertainment software 10; it may be performed in real-time during the execution of the entertainment software, or at any other point in time upon receipt of at least some of the data needing conversion.

Entertainment software 10 may be made up of different types of data, such as, video data, audio data, control data, and the like. In some systems, segments of the entertainment software 10 may be profiled to determine data types within the software. Then, appropriate compression and/or redaction may be performed. For example, sectors of a game for the PlayStation®2 entertainment platform may include or may be augmented with tags identifying data types (e.g., an audio tag, a video tag, a code tag, and the like). Source information may be processed according to its associated data type. For example, audio segments may be compressed using the MP3 format or any other audio compression technology. Other data types may be similarly compressed using any techniques now known or later developed to reduce the amount of information that must be network-delivered.

One skilled in the art will appreciate that any compression and/or decompression techniques may be used to reduce the amount of data that must be transmitted in the network delivery of entertainment software 10.

Often a video game will include video portions, such as, for example, an introductory video, and videos played upon completion of game goals. These videos may or may not significantly affect game play. For example, an introductory movie may be critical to the understanding of a game, and thus be necessary for game play, while another movie may serve but a limited purpose or a purpose unrelated to game play (e.g., a movie trailer or video game trailer). When extraneous audio and/or video exists, it may be removed to reduce storage requirements and reduce latency.

Figure 4:
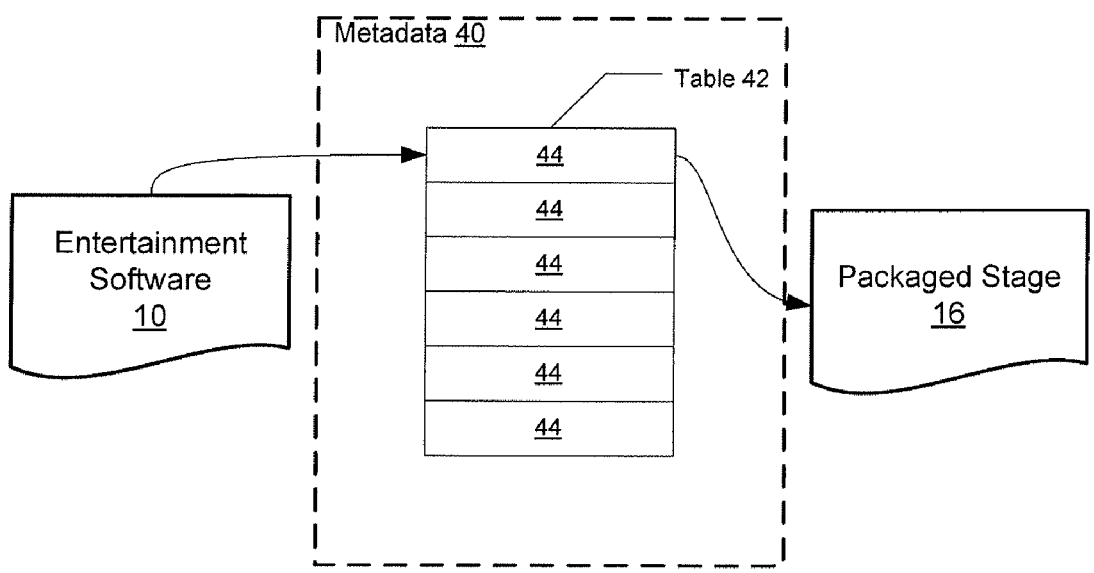

Referring to FIG. 4, a system to prepare the entertainment software 10 for network download creates a packaged stage 16 for use by an emulator. The packaged stage 16 includes or is associated with metadata 40, which provides information for use by the emulator to improve execution of the entertainment software 10. Metadata 40 includes, for example, code replacements, emulation preferences, emulation controls, presets, and the like. In addition to any metadata 40 included in the packaged stage 16, additional metadata 40 may be obtained through emulator updates, emulator distributions, and the like. Sometimes, particular entertainment software 10 is not well-behaved in an emulation environment. In these situations, it may be desirable for the emulator to maintain modifications, configurations, and/or other metadata 40 associated with various entertainment software 10 titles to facilitate their use.

In this implementation, entertainment software 10 running on an emulator accesses content using a "READ" instruction. In the original entertainment software 10, each READ instruction identifies a block of data to be accessed and a portion within such block of memory to return. The emulator adds a layer of abstraction to READ requests by using table 42. Any indexing techniques can be used; however, for purposes of explanation, table 42 includes a series of rows 44, with each row 44 corresponding to a block of data storage within the entertainment software 10. Rows 44 in table 42 identify the location where such block of memory may be found. For example, the row 44 may point to a location within the packaged stage 16 (as shown) or may point to any other location (e.g., a file on a local data store, a file on removable media, a network accessible file, or the like). Alternatively, a row 44 may include or identify replacement content or other content to implement any of the techniques described herein.

If the entertainment software 10 makes a READ request for a block of memory for which there is no corresponding entry in table 42 or for which the corresponding row 44 fails to identify available content, then the emulator may be unable to continue. When this occurs, various options are possible, including, notifying the user that limits of the packaged stage 16 have been reached, attempting to resume emulation from a previous point (either with or without user notification), continuing emulation until a predetermined number of errors occur or the frequency of errors passes a predetermined threshold, or the like. User notification may include, for example, giving a user the option to purchase the full entertainment software 10 or additional portions of the entertainment software 10 from an online store.

The above techniques to enhance download and data streaming are applicable to a multitude of commercial and marketing models, including those set forth below, which are provided by way of example only.

Staged Levels

As discussed above, entertainment software 10 may be staged for download, with the first stage corresponding to one or more levels. Expanding on this concept, additional stages may be created for download (with each stage separately usable, or with the first stage separately usable and the additional stages providing incremental functionality built using portions of the first or subsequent stages.

In one implementation, the apportionment techniques above are used to create separate stages corresponding to one or more levels (or other discrete portions) within a video game. To do this, an entertainment software packaging system 36 is used to emulate the video game while one or more users play the desired stage. Once sufficient data has been captured, the stage may be packaged. This technique is repeated for each additional desired stage.

In this manner, multiple stages are created for download. Instead of simply using staged downloading to improve a user's experience, staged downloading also may be used to allow a user to purchase only those levels he or she desires to play. As the user progresses through the game, he or she may purchase additional levels.

Time Interval Staging

As discussed above, it is possible to stage a download based on a desired software execution time interval. This may be done by capturing data using an emulator for the desired period of time. Once a time-interval stage has been created, it may be used as a demonstration, it may be used to sell time-limited versions of the entertainment software 10, or it may simply be used to stage downloading of the entire entertainment software 10. When used to offer a time-limited stage for sale, it may be desirable to include an additional mechanism to disable the entertainment software 10 after the purchased time interval has elapsed. By purchasing time-limited software, a user may perform a cost/benefit analysis to determine whether he or she would benefit from purchasing the entire entertainment software 10.

Generic Stage

In one implementation, a generic stage comprising the fundamental or core data files is created using the techniques described above. Additional stages may be created that add content. For example, the techniques described above may be used to create a first stage for a video game that encompasses the general framework necessary to play the video game. This generic first stage may be enhanced by later stages that are separately available for purchase. In some situations, it may be desirable to provide the generic stage to customers without charge and provide additional stages to add features for a fee.

Customer Behavior Analysis

Using the emulation techniques described above, it is possible to capture data about various points within a video game. These same emulation techniques may be employed on the entertainment platform 30 to capture information regarding player actions and use of downloaded software. This data may be captured by a back-end system to improve the user experience. In most implementations, it is important to maintain the privacy of individual users. Accordingly, it is desirable to anonymize and aggregate data at the back-end system. Using the aggregated data, policies may be created to allow entertainment platforms 30 to modify behavior during the download and/or execution by a particular user. Such data can be used to insert targeted advertisement and other data files based on the users profile that is preferably only available on the local entertainment platform 30. In addition, such monitoring allows for performance feedback that may be used to enhance and improve the overall downloading system.

Staged Extensions or Add-Ons

In one implementation, similar to the generic stage discussed above, an entertainment platform 30 may be used to download a first stage of entertainment software 10 for free; however, additional stages (such as those providing additional content, levels, enhancements, and the like) are available for purchase as additional downloads.

Customer Loyalty

To create and/or increase customer loyalty, information may be collected by the entertainment platform 30. This information may be used to provide discounts, awards, or some other benefit to encourage use of entertainment software 10 and to foster and further develop customer loyalty. For example, if downloaded entertainment software 10 is executed using an emulator running on an entertainment platform 30, the emulator may be configured to collect statistics regarding the use of downloads. For example, the emulator may collect statistics regarding the amount of time spent using the entertainment software 10, regarding milestones reached (e.g., levels attained, races won, records broken, feats accomplished, opponents defeated, and the like). Using this information, an online store running on server 32 may provide discounts or awards.

Advertisement-Supported Downloads

Furthermore, the techniques described above may be used to create different versions of software. In this manner, one version of the entertainment software 10 may include an incentive to encourage customers to purchase additional stages. For example, this may be accomplished by placing advertisements within the entertainment software 10. The first stage of software may be provided for free and be supported, at least partially, by advertising revenue, while also encouraging customers to purchase additional entertainment software 10.

Replacement, Modification, and Overlay

Finally, the techniques described above may be used to create a usable first stage of the entertainment software 10. This first stage then may be modified and/or enhanced, for example, by replacing, modifying, overlaying data, or the like. For example, a video game may be staged as discussed above, then the stage may be overlaid with information, such as, a banner indicating that the entertainment software 10 is a demonstration or trial version.

Multiple Stages

When multiple packaged stages 16 corresponding to entertainment software 10 are downloaded, each packaged stage 16 can be configured to include non-overlapping portions of the entertainment software 10. Additional packaged stages 16 may be used by providing multiple tables 42. Each table 42 may be consolidated into a single table 42 or the emulator may iteratively query tables 42 to identify content corresponding to a READ request.

In some situations, it may be useful to modify content associated with a particular location when an additional packaged stage 16 is added. For example, it may be desirable to provide a modified splash screen when a packaged stage 16 is added. Thus, packaged stages 16 may include some overlap. When packaged stages 16 include overlapping data, it is desirable for emulation to query tables 42 in a predetermined order such that execution of the entertainment software 10 is deterministic.

Sale of Staged Software

The techniques described herein may be used to create packaged stages 16 of entertainment software 10 which can be sold for distribution across a network. Conventional entertainment software 10 is either sold by brick-and-mortar retail stores, sold by online stores for delivery through the mail, or sold by online stores for network delivery. Using the techniques described herein, various portions of entertainment software 10 titles may be sold, instead of the entire title. This facilitates many new sales structures. For example, entertainment software 10 may be sold by subscription, sold by download size, or sold using a discounted rental model (e.g., the entire entertainment software 10 may be discounted based on previous purchases of one or more packaged stages 16).

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for preparing entertainment software for reduced network delivery time, the method comprising:
    analyzing entertainment software to identify a first software stage implementing a subset of the functionality of the complete entertainment software such that the first software stage is deliverable to an entertainment platform across a network more quickly than the delivery of the complete entertainment software; and
    preparing the identified first software stage for download, such that the identified first software stage is usable on the entertainment platform to execute a subset of the functionality of the complete entertainment software,
    wherein analyzing the entertainment software to identify the first software stage includes:
        executing the entertainment software using an emulator before delivery to the entertainment platform, the emulator collecting data related to the execution of the entertainment software; and
        using the data collected by the emulator to identify the first stage.

2. The method of claim 1, wherein analyzing the entertainment software to identify the first software stage includes:
    receiving input from a user of the entertainment software being executed using the emulator.

3. The method of claim 2, wherein collecting data related to the execution of the entertainment software includes collecting from multiple executions of the entertainment software.

4. The method of claim 2, wherein collecting data related to the execution of the entertainment software includes recording portions of the entertainment software accessed during the execution of the entertainment software using an emulator.

5. The method of claim 2, wherein receiving input from a user of the entertainment software includes receiving an indication that a portion of the entertainment software should be included in the first stage.

6. The method of claim 2, wherein receiving input from a user of the entertainment software includes receiving an indication that a portion of the entertainment software should not be included in the first stage.

7. The method of claim 1, wherein preparing the first stage for download includes compressing at least a portion of the first stage.

8. The method of claim 1, wherein preparing the first stage for download includes removing at least a portion of the first stage.

9. A video game distribution method comprising:
    providing a video game deliverable in multiple stages;
    providing a data store of distribution information;
    distributing a first stage of the video game using the distribution information, the data store providing a subset of functionality of the video game, wherein the video game is analyzed by an emulator to determine the first stage before distribution thereof, wherein analyzing the video game to identify the first stage includes executing the video game using the emulator, the emulator collecting data related to the execution of the video game, and using the data collected by the emulator to identify the first stage;
    receiving information regarding the use of the distributed first stage; and
    updating the distribution information based on the received information.

10. The video game distribution method of claim 9, wherein the distribution information includes information regarding customer purchases and customer use of distributed video games.

11. The video game distribution method of claim 10, wherein the distribution information is used to provide customer rewards.

12. A method for distributing video games across a network, the method comprising:
    distributing a first stage of a video game facilitating game play of a portion of the video game;
    distributing a second stage of the video game facilitating game play of a portion of the video game not provided by the first stage,
    wherein the video game is analyzed by an emulator to determine the first stage and the second stage before distribution thereof,
    wherein analyzing the video game to identify the first stage and the second stage includes executing the video game using the emulator, the emulator collecting data related to the execution of the video game, and using the data collected by the emulator to identify the first stage and the second stage,
    wherein the first stage of the video game is usable to play the video game before the second stage of the video game has been received,
    wherein the second stage is distributed upon satisfaction of a predetermined condition.

* * * * *